Aug. 17, 1971 W. SLOT ET AL 3,600,154
PROCESS FOR THE CONTINUOUS PREPARATION OF
NITROPHOSPHATE FERTILIZERS
Filed Feb. 28, 1969
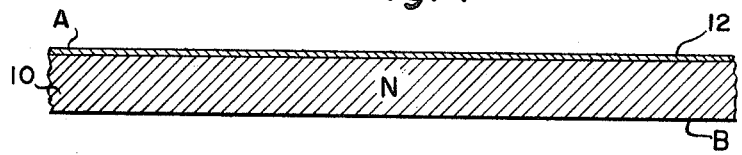
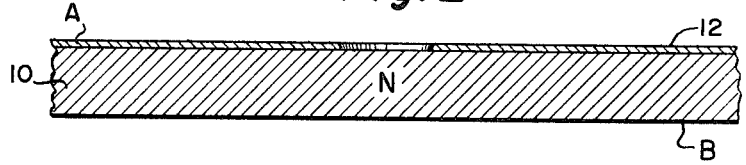
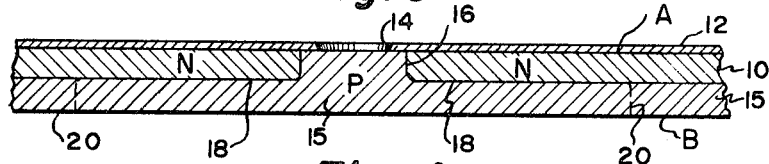
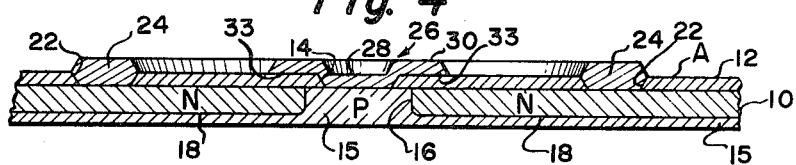
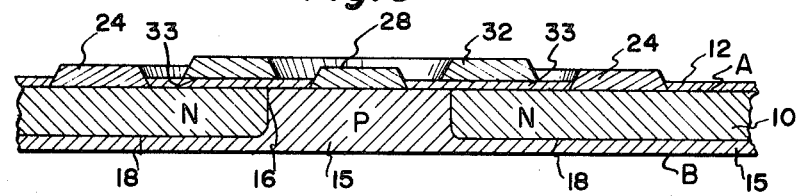
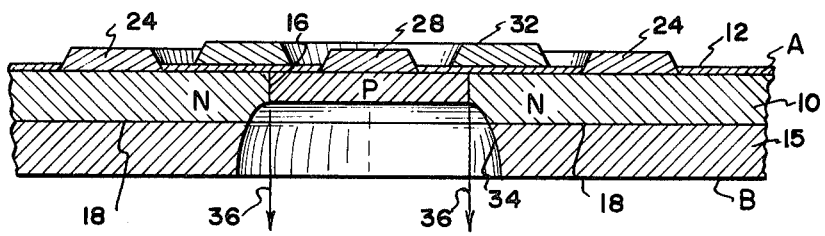
INVENTOR
Hans J. Kunz
BY *Sughrue, Rothwell, Mion, Zinn & Macpeak*
ATTORNEYS United States Patent Office 3,600,154
Patented Aug. 17, 1971

3,600,154
PROCESS FOR THE CONTINUOUS PREPARATION
OF NITROPHOSPHATE FERTILIZERS
Willem Slot, Heerlen, and Johan D. Logemann, Geleen,
Netherlands, assignors to Stamicarbon N.V., Heerlen,
Netherlands
Filed Feb. 28, 1969, Ser. No. 803,261
Claims priority, application Netherlands, Feb. 29, 1968,
6802841
Int. Cl. C05b 11/06
U.S. Cl. 71—35
3 Claims

ABSTRACT OF THE DISCLOSURE

An improved process for the continuous preparation of a nitrophosphate fertilizer wherein phosphate rock is decomposed in an aqueous solution containing sufficient nitric acid to dissolve the phosphate rock, sulphuric acid is then added to the solution in a sufficient amount to precipitate gypsum with the simultaneous reformation of nitric acid, additional phosphate rock is then added to the solution and dissolved by the reformed nitric acid, ammonium sulphate is then added to the solution to react with the dissolved calcium ions obtained in dissolving the additional phosphate rock, thereby precipitating additional gypsum, the precipitated gypsum is then separated from the solution, and the gysum-free solution is then neutralized with ammonia and evaporated to dryness to form a solid fertilizer composition.

A process for the continuous preparation of nitrophosphate fertilizers is disclosed, wherein phosphate rock is decomposed in two decomposition zones, and dissolved calcium is precipitated as gypsum by addition of sulphate ions in two precipitation zones separated from the decomposition zones.

The gypsum is separated from the mother liquor by filtration, and the mother liquor is converted into a solid fertilizer product by successive neutralisation, evaporation and granulation steps.

The disclosed process has the advantage compared to prior processes that phosphate rock is more completely dissolved and that the precipitated gypsum needs less filter surface.

The invention relates to an improved continuous process for the preparation of nitrophosphate fertilizers, comprising decomposition of phosphate rock by means of nitric acid, or sulphuric acid and nitric acid, removal of dissolved calcium by precipitation of calcium in the form of gypsum by addition of sulphate ions from sulphuric acid and/or dissoluble sulphates, in particular ammonium and potassium sulphate, filtration of the gypsum so formed, and further processing the mother liquor containing phosphoric acid, by neutralisation, evaporation and granulation into a solid fertilizer.

Such a process is justified technologically and economically only if the phosphate rock is virtually completely decomposed, and if the gypsum precipitate does not form a viscous mass and is easy to filter and wash, so that only a relatively small filter area and little washing water are needed per ton of precipitate.

Further, the process should be insensitive to deviations in the feed rate of the reaction components.

It is well-known that a satisfactory gypsum precipitate can be obtained if parent liquor freed of gypsum, with or without some of the previously formed precipitate, is fed back to the gypsum precipitation zone.

In the preparation of nitrophosphate fertilizers containing N and $P_2O_5$ in a weight ratio of less than 1.7:1— which implies that, in addition to nitric acid, sulphuric acid is needed for decomposing the phosphate rock—it may happen that some phosphate rock, being covered up with a precipitated gypsum layer, does not go into solution, with the result that the degree of decomposition is adversely influenced and will amount to no more than, say, 97%, calculated to the infed quantity of phosphate rock.

The process according to the invention for the preparation of nitrophosphate fertilizers aims, on the one hand, at an improvement of the degree of decomposition in the continuous preparation of fertilizers with a $N/P_2O_5$ weight ratio of less than 1.7:1, and, on the other hand, at a further improvement of the nature of the gypsum precipitate to the extent that ¾–1 ton of gypsum per huor can be filtered per m.² of filter area.

Said objectives are achieved by combination of the following features:

(1) Decomposition of the phosphate rock in two stages, by first dissolving in the first stage a first portion of the phosphate rock comprising 25 to 75% of the total phosphate rock to be treated by the process in nitric acid having a concentration of at least 40% by weight, preferably 50–55% by weight, with simultaneous formation of calcium nitrate and phosphoric acid;

(2) Dilution of the calcium nitrate/phosphoric acid solution so formed with such an amount of recirculating gypsum-free parent liquor containing phosphoric acid that, after precipitation of gypsum, the ultimate gypsum suspension to be filtered will contain at most 30% by weight, preferably 17–23% by weight, of gypsum;

(3) Precipitation of the dissolved calcium content of the solution obtained in step (2) in the form of gypsum by adding sufficient sulphuric acid to the solution to convert the calcium nitrate contained therein into gypsum, and nitric acid;

(4) Decomposition of the remaining phosphate rock to be treated, which was not treated in step (1), in a second stage by dissolving said remaining rock in the solution containing nitric acid obtained in step (3), and should the amount of $HNO_3$ contained in the solution from the step (3) be insufficient to dissolve the phosphate rock, the phosphate rock is dissolved by the phosphoric acid contained therein, forming monocalcium phosphate in addition to the calcium nitrate formed by the dissolution by the nitric acid;

(5) Precipitation of gupsum from the dissolved calcium in the solution obtained from step (4) by adding sufficient amount of ammonium sulphate or potassium sulphate to react with the calcium nitrate, and adding a sufficient amount of sulphuric acid to react with the calcium monophosphate;

(6) Filtration of the gypsum suspension obtained from step (5) to partially or completely separate the mother liquor from the gypsum precipitate and recirculation of a portion of the gypsum free mother liquor to the dilution step (step 2). A portion of the gypsum— mother liquor suspension from step (5) can be recirculated to the first precipitation step (step 3) to provide crystal nuclei upon which further gypsum deposits. The mother liquor from step (6) minus that which is recirculated to step (2) containing a quantity of $P_2O_5$ approximately equivalent to the amount of decomposed phosphate rock is then further processed in known manner by neutralization, evaporation and granulation to form a solid fertilizer composition.

An essential feature of the process according to the invention is that the two zones for the decomposition of the phosphate rock and the two gypsum precipitation zones are kept separated from each other. As a result, gypsum is formed exclusively by reaction of sulphate ions with phosphate rock previously brought into solution.

A method for realizing the process will be explained with reference to the figure, which is a diagrammatic representation of a number of series-connected mixing vats 1–6, a filter 8, the required conduits 10, 11, 13–18 and the pumps 7, 9 and 12.

The first portion of the phosphate rock to be treated and nitric acid are supplied via conduit 14 and 15, respectively, to mixing vat 1, in which the phosphate rock is decomposed into calcium nitrate and phosphoric acid.

Via the overflow pipe, the decomposition liquid so obtained flows into mixing vat 2, to which the diluting solution freed of gypsum is supplied via conduit 10, and, if so required, also gypsum slurry via conduit 13. Furthermore, sulphuric acid is admitted via conduit 16 in an amount at least sufficient for converting dissolved calcium nitrate into gypsum and nitric acid.

The gypsum suspension containing free nitric acid formed in mixing vat 2, flows, via the overflow pipe, into mixing vat 3, to which, furthermore, the remainder of the amount of phosphate rock to be decomposed is supplied through conduit 17. The suspension from vat 3 is transferred to mixing vat 4, which serves as an afterreactor. The reacted solution from vat 4, which contains calcium nitrate, flows into mixing vat 5, where the second gypsum precipitation is effected by adding a solution of ammonium sulphate or potassium sulphate through conduit 18 in an amount sufficient to react with the calcium nitrate. If the reacted solution from vat 4 contains monocalcium phosphate a sufficient amount of sulphuric acid is also added through conduit 18 to precipitate gypsum from the monocalcium phosphate. The gypsum precipitation starts in mixing vat 5 and is completed in mixing vat 6, which is series-connected to mixing vat 5.

Part of the gypsum slurry formed can be recycled from mixing vat 6 to the mixing vats 2 and/or 3 via pump 12 and conduit 13, the remainder being fed to filter 8 via pump 7. The gypsum obtained from the filtration in an amount equivalent to the amount of calcium in the decomposed phosphate rock, is discharged via conduit 9a, while part of the resulting solution of phosphoric acid and ammonium nitrate and/or potassium nitrate is recycled via pump 9 and conduit 10 vat 2 and the remainder, which contains an amount of phosphoric acid equivalent to the amount of phosphate rock supplied via conduits 14 and 17, is discharged via conduit 11 for further processing.

To obtain a good gypsum precipitate, gypsum slurry from the 2nd gypsum precipitation stage may, if so required, be recycled to the 1st gypsum precipitation stage, e.g., in an amount containing as much gypsum as the gypsum to be precipitated.

The process may be started up with water, or a previously prepared solution containing phosphoric acid and ammonium nitrate, or a gypsum suspension, being used as the recycle flows. Assuming that the phosphate rock conforms with the formula $[Ca_3(PO_4)_2]_3 \cdot CaF_2$, the reactions taking place in the process according to the invention for the ultimate preparation of a fertilizer with an $N-P_2O_5$ weight ratio of 1:1, can be expressed by the following formulas:

Mixing vat 1:

$$[Ca_3(PO_4)_2]_3 \cdot CaF_2 + 24HNO_3 \longrightarrow$$
$$10Ca(NO_3)_2 + 4HNO_3 + 6H_3PO_4 + 2HF\nearrow$$

Mixing vat 2:

$$10Ca(NO_3)_2 + 10H_2SO_4 + 20H_2O \longrightarrow 10CaSO_4 \cdot 2H_2O + 20HNO_3$$

Mixing vats 3 and 4:

$$[Ca_3(PO_4)_2]_3 \cdot CaF_2 + 24HNO_3 \longrightarrow$$
$$10Ca(NO_3)_2 + 4HNO_3 + 6H_3PO_4 + 2HF\nearrow$$

Mixing vats 5 and 6:

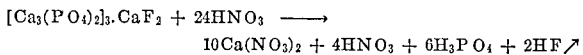
$$10Ca(NO_3)_2 + 10(NH_4)_2SO_4 + 20H_2O \longrightarrow$$
$$10CaSO_4 \cdot 2H_2O + 20NH_4NO_3$$

The gross equation for the overall decomposition of the phosphate rock and the overall gypsum precipitation reads:

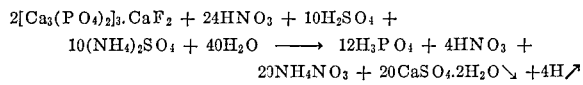
$$2[Ca_3(PO_4)_2]_3 \cdot CaF_2 + 24HNO_3 + 10H_2SO_4 +$$
$$10(NH_4)_2SO_4 + 40H_2O \longrightarrow 12H_3PO_4 + 4HNO_3 +$$
$$20NH_4NO_3 + 20CaSO_4 \cdot 2H_2O\searrow + 4HF\nearrow$$

Neutralisation of the phosphoric acid in the solution from line 11 to monoammonium phosphate with $NH_3$, evaporation and granulation, will ultimately yield a nitrophosphate fertilizer with a molar $N/P_2O_5$ ratio equal to 60:6, or an $N-P_2O_5$ weight ratio equal to 1:1.

By varying the ratio between the amounts of phosphate rock to be decomposed in mixing vat 1 and mixing vat 3, and, furthermore, by varying the ratio between the amounts of nitric acid and sulphuric acid, the $N-P_2O_5$ weight ratio can be made to deviate from 1:1.

To obtain a ratio of more than 1:1, it will suffice for example, to add a larger excess of nitric acid with respect to the amount of phosphate rock to be decomposed in mixing vat 1. This excess will then get into the end product as additional $NH_4NO_3$. A ratio of less than 1:1 can be obtained by reducing the total amount of $HNO_3$ and increasing the amount of sulphuric acid accordingly.

In that case one may first decompose phosphate rock with $HNO_3$ into calcium nitrate and phosphoric acid, and subsequently recover $HNO_3$ again from calcium nitrate with sulphuric acid, and use this $HNO_3$, together with recycled phosphoric acid, for dissolving a second quantity of phosphate rock with formation of a mixture of calcium nitrate, monocalcium phosphate and phosphoric acid, and finally precipitate the dissolved calcium in the form of gypsum with the aid of ammonium sulphate and free sulphuric acid, with simultaneous formation of ammonium nitrate and phosphoric acid.

Phosphate rock can be decomposed more rapidly with nitric acid than with phosphoric acid. For obtaining a high decomposition efficiency, at most 75% of the total amount of phosphate rock to be decomposed may be supplied to the 2nd decomposition zone (mixing vat 3), so that actually not more than 50% of the total amount of phosphate rock to be decomposed is decomposed with phosphoric acid. In that case, tre reactions taking place can be expressed as follows:

Mixing vat 1:

$$[Ca_3(PO_4)_2]_3 \cdot CaF_2 + 20HNO_3 \longrightarrow 10Ca(NO_3)_2 + 6H_3PO_4 + 2HF\nearrow$$

Mixing vat 2:

$$10Ca(NO_3)_2 + 10H_2SO_4 + 20H_2O \longrightarrow 10CaSO_4 \cdot 2H_2O\swarrow + 20HNO_3$$

Mixing vats 3 and 4:

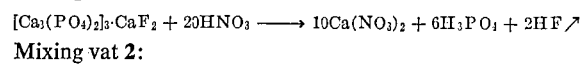
$$[Ca_3(PO_4)_2]_3 \cdot CaF_2 + 20HNO_3 \longrightarrow 10Ca(NO_3)_2 + 6H_3PO_4 + 2HF\nearrow$$

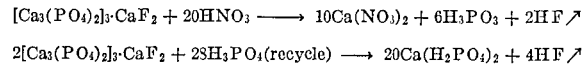
$$2[Ca_3(PO_4)_2]_3 \cdot CaF_2 + 28H_3PO_4(recycle) \longrightarrow 20Ca(H_2PO_4)_2 + 4HF\nearrow$$

Mixing vats 5 and 6:

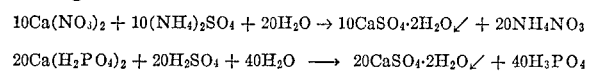
$$10Ca(NO_3)_2 + 10(NH_4)_2SO_4 + 20H_2O \rightarrow 10CaSO_4 \cdot 2H_2O\swarrow + 20NH_4NO_3$$

$$20Ca(H_2PO_4)_2 + 20H_2SO_4 + 40H_2O \longrightarrow 20CaSO_4 \cdot 2H_2O\swarrow + 40H_3PO_4$$

The gross equation for the overall phosphate rock decomposition and the overall gypsum precipitation will then read:

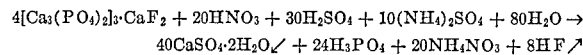
$$4[Ca_3(PO_4)_2]_3 \cdot CaF_2 + 20HNO_3 + 30H_2SO_4 + 10(NH_4)_2SO_4 + 80H_2O \rightarrow$$
$$40CaSO_4 \cdot 2H_2O\swarrow + 24H_3PO_4 + 20NH_4NO_3 + 8HF\nearrow$$

Neutralisation of the phosphoric acid to monoammonium phosphate, evaporation and granulation will now yield a fertilizer with a molar $N/P_2O_5$ ratio equal to 64:12, or an $N/P_2O_5$ weight ratio equal to 0.53:1.

To elucidate the invention, a numerical example will now be given of the continuous preparation of a fertilizer with an $N/P_2O_5$ weight ratio equal to 1:1.

EXAMPLE

Phosphate rock (50% by weight of CaO and 32.6% by weight of $P_2O_5$) and nitric acid of 52.5% by weight concentration were supplied to mixing vat 1 at rate of 2.5 and 5.7 tons per hour respectively. The temperature was kept at 65° C. The resulting solution flowed into mixing vat 2 to which, besides 27 tons of gypsum suspension recycled via conduit 10 and containing 9% by weight of $P_2O_5$ and 19.5% by weight of gypsum, plus 17.5 ton of gypsum free filtrate recycled via conduit 13 and containing 11.5% by weight of $P_2O_5$, 2.3 tons of sulphuric acid were supplied. This reaction mass flowed into mixing vat 3, to which furthermore 2.5 tons of phosphate rock were admitted, while 7.8 tons of ammonium sulphate solution of 40% by weight concentration were supplied to the reaction mass in mixing vat 5.

Upon filtration, 14.2 tons of mother liquor containing 3.8 tons of dissolved ammonium nitrate and 2.23 tons of dissolved phosphoric acid were obtained, which, upon neutralisation with 0.17 t. of $NH_3$, evaporation and granulation, yielded 6.5 tons of fertilizer.

The gypsum was separated out on 10 m.² of filter area as a wet gypsum cake containing 8.2% of CaO and 0.15% of $P_2O_5$, at a rate of 7.7 tons per hour. The decomposition efficiency was 99%.

If the process according to the invention should be deviated from, e.g., by employing ammonium sulphate in the first gypsum precipitation stage and sulphuric acid in the second gypsum precipitation stage, the decomposition efficiency would be at most 97–98%.

What is claimed is:

1. A continuous process for the preparation of nitrophosphate fertilizer compositions in which phosphate rock is decomposed and dissolved in two separate and distinct zones, dissolved calcium is precipitated in the form of gypsum in two separate and distinct zones, insoluble solids, including the gypsum, are removed and resulting mother liquor is processed into a solid fertilizer composition by neutralization, evaporation and granulation, said process comprising the steps of:

(a) dissolving a first portion comprising 25 to 75% of the total phosphate rock to be treated in the process in a first reaction zone, said dissolution being accomplished by treating said first portion of phosphate rock with nitric acid in said first reaction zone, thereby producing a solution of calcium nitrate and phosphoric acid, said nitric acid having a concentration of at least 40% by weight, (b) diluting the calcium nitrate and phosphoric acid solution from step (a) with a gypsum-free aqueous liquor containing phosphoric acid obtained in the process from step (f), said dilution being to an extent that the gypsum content of the ultimate suspension to be filtered in step (f) will be at most 30% by weight, (c) adding sulphuric acid to the calcium nitrate, phosphoric acid solution from step (b) in an amount to at least convert the calcium nitrate into calcium sulphate and nitric acid, (d) adding the remaining untreated portion of the phosphate rock referred to in step (a) to the gypsum suspension of step (c) in a separate reaction zone and thereby dissolving said remaining portion of the phosphate rock with the reformed nitric acid and phosphoric acid contained in said gypsum suspension, forming calcium nitrate, phosphoric acid and monocalcium phosphate, (e) adding a sulphate selected from the group consisting of ammonium sulphate and potassium sulphate to the suspension formed in step (d) in a separate precipitation zone to react with the calcium nitrate, thereby forming insoluble gypsum and soluble nitrates; and also adding sulphuric acid concurrently with the sulphate in an amount sufficient to react with the monocalcium phosphate to form additional insoluble gypsum and phosphoric acid, (f) filtering the suspension from step (e) to remove the insoluble gypsum, leaving a solution containing $H_3PO_4$ and $HNO_3$, (g) further processing the solution of step (f) to neutralize said solution with ammonia, evaporating the neutralized solution to dryness and granulating said dried product.

2. A process as claimed in claim 1 wherein a portion of the gypsum containing suspension from step (e) is recirculated and added to the solution entering step (c) thereby supplying nucleating crystals of gypsum to the first precipitation zone upon which the gypsum to be precipitated can form.

3. A process as claimed in claim 2 wherein the recirculated gypsum from step (e) to step (c) is in an amount at least equal to the amount of gypsum which is to be precipitated in the first precipitation zone.

References Cited
UNITED STATES PATENTS

| | | | |
|---|---|---|---|
| 1,821,309 | 9/1931 | Johnson | 71—29 |
| 1,902,652 | 3/1933 | Liljenroth | 71—35 |
| 1,916,429 | 7/1933 | Larsson | 71—35 |
| 3,475,153 | 10/1969 | Abbott et al. | 71—35 |

SAMIH N. ZAHARNA, Primary Examiner

B. H. LEVENSON, Assistant Examiner

U.S. Cl. X.R.
23—122; 71—37, 39

UNITED STATES PATENT OFFICE
Certificate of Correction

Patent No. 3,600,154                          August 17, 1971

Willem Slot et al.

It is certified that error appears in the above-identified patent and that said Letters Patent are hereby corrected as shown below.

The sheet of drawings should appear as shown below:

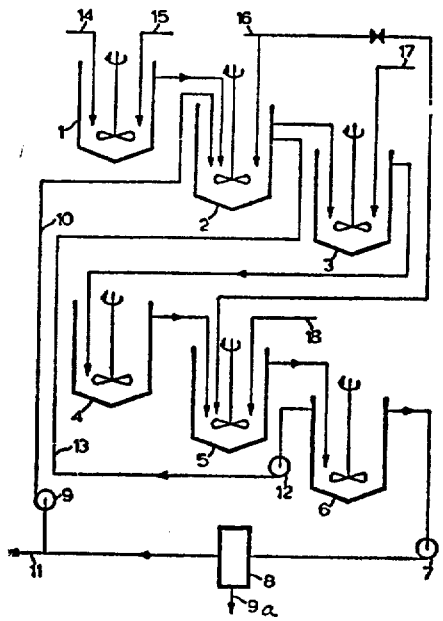

Column 2, line 14, "huor" should read —hour—; line 46, "gupsum" should read —gypsum—. Column 3, line 41, after "conduit 10" insert —to—. Column 4, line 7, "4H" should read —4HF—; line 43, "tre" should read —the—.

Signed and sealed this 9th day of May 1972.

[SEAL]

Attest:

EDWARD M. FLETCHER, JR.,                          ROBERT GOTTSCHALK,
*Attesting Officer.*                                       *Commissioner of Patents.*